United States Patent
Harris et al.

(10) Patent No.: US 11,738,319 B2
(45) Date of Patent: Aug. 29, 2023

(54) SYSTEM FOR OPTIMIZING FIRED-HEATER OPERATION THROUGH MONITORING OF HIGH TEMPERATURE DEHYDROGENATION PROCESSES

(71) Applicant: UOP LLC, Des Plaines, IL (US)

(72) Inventors: James W. Harris, Palatine, IL (US); Parag Jain, Morton Grove, IL (US); Paul Adams, Hartland, WI (US); Michael J. Grapenthien, Park Ridge, IL (US); Louis A. Lattanzio, Mount Prospect, IL (US); Priyank Tiwari, Jhansi (IN); Charles P. Luebke, Mount Prospect, IL (US); Zudtky Wisecraver, Des Plaines, IL (US); Christopher DiGiulio, Elmhurst, IL (US)

(73) Assignee: UOP LLC, Des Plaines, IL (US)

( * ) Notice: Subject to any disclaimer, the term of this patent is extended or adjusted under 35 U.S.C. 154(b) by 151 days.

(21) Appl. No.: 17/329,591

(22) Filed: May 25, 2021

(65) Prior Publication Data

US 2022/0379281 A1 Dec. 1, 2022

(51) Int. Cl.
*B01J 19/00* (2006.01)
*C07B 35/04* (2006.01)
(Continued)

(52) U.S. Cl.
CPC ....... *B01J 19/0013* (2013.01); *B01J 19/0033* (2013.01); *B01J 19/24* (2013.01);
(Continued)

(58) Field of Classification Search
CPC .... B01J 19/0013; B01J 19/0033; B01J 19/24; C07B 35/04; G01N 30/06; G01N 2030/025; G01N 2030/067
See application file for complete search history.

(56) References Cited

U.S. PATENT DOCUMENTS

| 4,237,093 A | 12/1980 | McCoy |
| 2009/0192340 A1 | 7/2009 | Culp et al. |

(Continued)

FOREIGN PATENT DOCUMENTS

| CN | 202614732 U | 12/2012 |
| CN | 106950147 A | 7/2017 |

OTHER PUBLICATIONS

Du et al. ("Exergy analysis of propane dehydrogenation in a fluidized bed reactor: Experiment and MP-PIC simulation", Energy Conversion and Management 202 (2019) 112213) (Year: 2019).*
(Continued)

*Primary Examiner* — Ali Z Fadhel
(74) *Attorney, Agent, or Firm* — Paschall & Associates, LLC; Mark Goldberg

(57) ABSTRACT

A process and system for monitoring and controlling the operation of a dehydrogenation reactor is provided. Samples of hydrocarbon streams are taken at sampling locations to be analyzed at a single gas chromatograph or other analytical equipment. Actions can be taken to modify the operation of the dehydrogenation reactor as necessary to maintain its operation within predetermined parameters. In particular, actions may be taken when a hydrocarbon stream exhibits an amount of cracking that is outside parameters. It is usually intended that actions will be taken on a gradual basis once or twice per day to reduce the cost of the process while still providing the necessary changes to operations.

20 Claims, 2 Drawing Sheets

Figure 1:
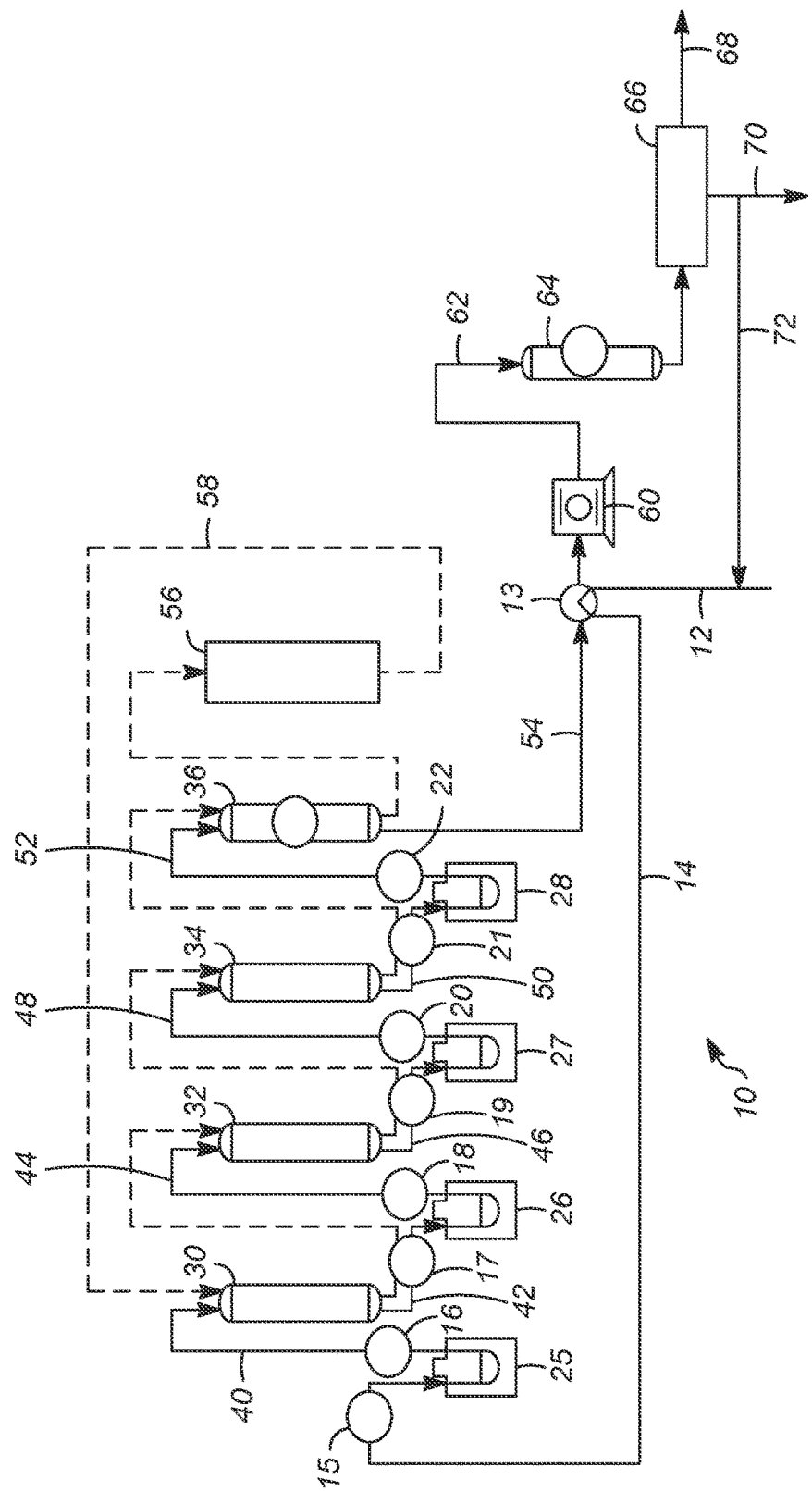

(51) Int. Cl.
   *B01J 19/24*         (2006.01)
   *G01N 30/06*       (2006.01)
   *G01N 30/02*       (2006.01)

(52) U.S. Cl.
   CPC .............. *C07B 35/04* (2013.01); *G01N 30/06* (2013.01); *G01N 2030/025* (2013.01); *G01N 2030/067* (2013.01)

(56) References Cited

U.S. PATENT DOCUMENTS

2019/0352240 A1    11/2019   Jo et al.
2020/0108327 A1*   4/2020   Ohaco .................... B01D 3/143

OTHER PUBLICATIONS

"Search Report and Written Opinion", dated Sep. 6, 2022.

\* cited by examiner

SYSTEM FOR OPTIMIZING FIRED-HEATER OPERATION THROUGH MONITORING OF HIGH TEMPERATURE DEHYDROGENATION PROCESSES

This invention relates to a process and system for monitoring the operation of a high temperature reaction. More particularly, there is described a process and system to monitor the operation of reactors and fired heaters and to improve the outcomes by fixing issues which occur between maintenance cycles.

In dehydrogenation process units, operations are adjusted based on feed consumption and production rate with little or no guidance on the specific locations, where cracking and non-selective reactions are occurring inside the reactor circuit, typically comprising a series of four fired heaters and four reactors. Most operators today, do not have a way of pinpointing if there is excessive cracking caused by a particular heater or if the reactor profile is sub-optimal for their production targets. Due to the low operating pressures in the reactor circuit, it is very difficult to collect a sample around the third and fourth reactors using a traditional sample station. In high temperature catalytic propane dehydrogenation technologies one of the challenges is to monitor and fix the fired-heater mal-operation issues that may go unnoticed in-between maintenance cycles and then cause undesired non-selective feed thermal cracking. A further issue is to optimize the key operating parameters in the reactor section, namely the reactor inlet temperature based on real-time plant behavior, for minimizing the operating costs in terms of feed consumption. The key missing piece of this puzzle is the inter-reactor compositional information, which helps benchmark online, the current performance behavior of each of the individual reactors and heaters for optimizing the process real-time.

SUMMARY

A method is provided for monitoring and controlling a dehydrogenation reactor system which comprises a plurality of reactors and heaters. These heaters are positioned upstream from each reactor and a hydrocarbon feed stream is heated by each of the heaters and then is undergoing reactions in the reactors. The method comprises comparing samples of the composition at different points in the dehydrogenation reactor system to a predetermined composition range and then taking at least one action to modify operation of the dehydrogenation reactor system when the composition of a sample varies more than a predetermined amount from the predetermined composition range. The samples are analyzed such as by a gas chromatograph. Multiple samples may be sent to a single gas chromatograph for automatic analysis under a computer controlled sequencing scheme. In addition, plant process data may be monitored such as temperature, pressure and flow rate at each sampling location. Actions to modify operation are taken as needed, but generally not on a continuous basis, but instead between once per hour and once per week, between once per hour and once per day, or optimally at most twice per day. More frequent action may be taken when appropriate but usually not continuous changes and less than multiple times per hour. The variation in composition that is measured may be increases in hydrogen and C1-C2 compounds. Most often the dehydrogenation reactor system comprises at least four reactors with four heaters, each of which is located upstream of a reactor. At least a portion of the samples may be returned to the reactor system. The actions that may be taken in response to the sampling results include adjusting the operation of at least one heater to modify the temperature, take action to repair or otherwise maintain the heater, replace catalyst, adjust heater operating burners performance, or adjust reactor inlet temperature among the possible actions as well as others that are determined to be needed. The sampling device is first flushed with a quantity of sample before composition measurements are taken which involve determining the proportion of the sample that is a cracked product of C3 hydrocarbons such as C1, C2 hydrocarbons and hydrogen. The sample is cooled before analysis by a gas chromatograph, preferably to about 185 C to up to 300 C, such as from 204° C. to 250° C. or 260 C. but it generally is lowered to above condensing temperatures. The predetermined composition range is based upon a model of expected cracking of C3 hydrocarbons during operation of the reactors. The composition data may be visible on a display that is accessible to the operator of the plant. The composition data is compared to the predetermined composition range in determining whether, or not, actions are needed in response.

In another embodiment is providing a system for monitoring performance of an endothermic reactor system, such as a dehydrogenation reactor system. This system comprises a series of heaters with each of the heaters connected to a reactor inlet of each of a series of reactors. Each heater has a heater inlet and a heater outlet. There is a sampling location configured to remove a sample of a hydrocarbon composition positioned prior to an inlet and an outlet of each of said heaters and a sensor positioned at each of said sampling locations wherein each of said sensors is configured to measure at least one property selected from temperature, pressure and mass flow rate. A gas chromatograph is configured to receive each of said samples in sequence and to produce a report of each of said sample's composition. There is a database containing data of predicted compositions of the samples and predicted property values, a computer to compare a sample report with the predicted compositions; and there may be a display to show a visualization showing the comparison and suggesting corrective measures to take to return the composition in the report to the predicted and expected composition values. It is anticipated that where possible there will be a single chromatograph to analyze all samples. The system may also comprise sample take offs with automated isolation valves, a cooler to moderate the temperature of samples and pre-insulated sample connection lines to immediately reduce cracking potential of samples and to deliver consistent sampling conditions to the analyzer. There may be a common return line from all samples to a single point in the process to minimize loss of process fluid. The sample may be compressed to about the pressure of the system prior to being returned to the process. The system may be programmed so that any fluid is flushed prior to the taking of the next sample material.

DETAILED DESCRIPTION

The key enabler for inter-reactor/inter-heater compositional analysis is a reliable (low maintenance), cost-efficient, sampling system that handles high-temperature, low pressure dehydrogenation process streams for all locations of interest (typically nine, but more or less depending upon the particular circumstances), delivers a representative sample to the gas chromatography analyzer via an appropriate cycling/flushing/calibrating strategy, and returns the sample back to process for minimal to zero loss of products.

The key benefit that is provided is that it allows the customer to optimize the reactor inlet temperatures to achieve maximum production while minimizing feed consumption. Providing a method to measure composition on-line at the inlet and outlet of each reactor and heater further provides direction to the operation on which equipment is sub-optimal. By providing instructions to the operator it allows maximum production with minimal loss of feed or products.

In one embodiment, the sample is rapidly cooled down before it is sent to a pre-treatment system which knocks out any heavies or liquid hydrocarbons before it goes to the analyzer. This system should be implemented in the following locations in a four-reactor system: The hot combined feed exchange inlet, hot combined feed exchanger outlet, reactor 1 inlet, reactor 1 outlet (heater inlet), reactor 2 inlet, reactor 2 outlet (heater inlet), reactor 3 inlet, reactor 3 outlet (heater inlet), reactor 4 inlet and reactor 4 outlet. The sample system offered also returns nearly the entire sample to the process to minimize loss of product. A useful component of this system is that the source of process material to analyze cycles from point to point and the process material used in this cycle for the next analysis is used as the purge/flush agent from the previous sample.

A gas chromatograph (GC) offers the best availability, reliability, sensitivity and repeatability for this application. There are multiple GC options in the marketplace and some candidates are not applicable because of the high temperature of this application. Others do not have the appropriate accuracy or suffer when the sample includes contaminants that could occur in this application. It has been found that a single GC can be used in a cyclic fashion to deliver information from all nine points in less than one day. This will deliver useful operational decision information within the expected frequency needed to improve the operation of the catalytic dehydrogenation process. The cyclic process system will allow the application to flush the fast loop with the next sample material so that the analyzer should be highly reliable and deliver results for many months with limited direct support and maintenance. Understanding that the nature of the process as having a slow dynamic for the critical variables measured, this system does not intend to rapidly change samples and make continuous changes to the operation of the unit. Instead, the samples are analyzed to deliver updates to the cloud-based process model for process operational instructions to be updated one or two times per day or less often. This reduces the cost of the on-line analyzer solution while meeting the process benefit requirements for this application.

Improved fired heater performance is realized by implementing a new integrated sensors-based solution that combines a reliable high-temperature representative sampling system with online gas chromatography analyzers, which in-turn passes information to a cloud-based platform to utilize the compositional information and plant process data for bench-marking individual equipment pieces. Comparisons are made between the expected cracking from individual heaters, based on proprietary models, to actual inter-heater cracking in operation. Appropriate decision support advisories are generated to alert operators to issues and solutions. These include optimized operating adjustments and appropriate trouble-shooting advisory solutions to operators for fired-heaters.

An integrated sensors-based solution is employed that combines a novel, reliable, representative sampling system with online GC analyzers, which in-turn passes information to a cloud-based platform, that utilizes the compositional information along with plant process data for bench-marking individual equipment pieces, and then solves a real-time optimization problem to recommend an optimized reactor inlet temperature profile.

In a typical system, there are four reactors, each of which have a heater to heat the feed to that reactor. A sensor is then placed to obtain flow, temperature, pressure data both before and after each heater as well as sampling the composition of the feed that is being heated. The data is then compared to a benchmark set of data, subjected to a series of fault logic analysis and then visualization screens are provided that show the relevant composition data in the feeds and products.

Referring now to FIG. 1, a sensor and sampling system 10 is shown. A feed 12 which may have a fresh and/or recycled hydrocarbon feed. The feed passes through heat exchanger 13 and then continues as heated feed 14 to heater 25. Shown are sensors 15, 16, 17, 18, 19, 20, 21, 22 which provide composition data to a central data aggregation unit shown in FIG. 2. Also, shown in FIG. 1 are reactors 30, 32, 34 and 36 having inlet heated flows 40, 44, 48 and 52 and outlet flows 42, 46, 50 and 54. A catalyst regeneration reactor 56 is shown with dotted lines 58 showing the catalyst flow between the reactors. Also shown is a reactor effluent compressor 60 from which compressed gas 62 passes through a cooler 64 which may also have a sensor with gas passing to cold box 66 with hydrocarbon product 68, hydrogen recycle 72 and net gas 70 shown. The hydrogen recycle stream 72 is returned to feed 12.

Figure 2:
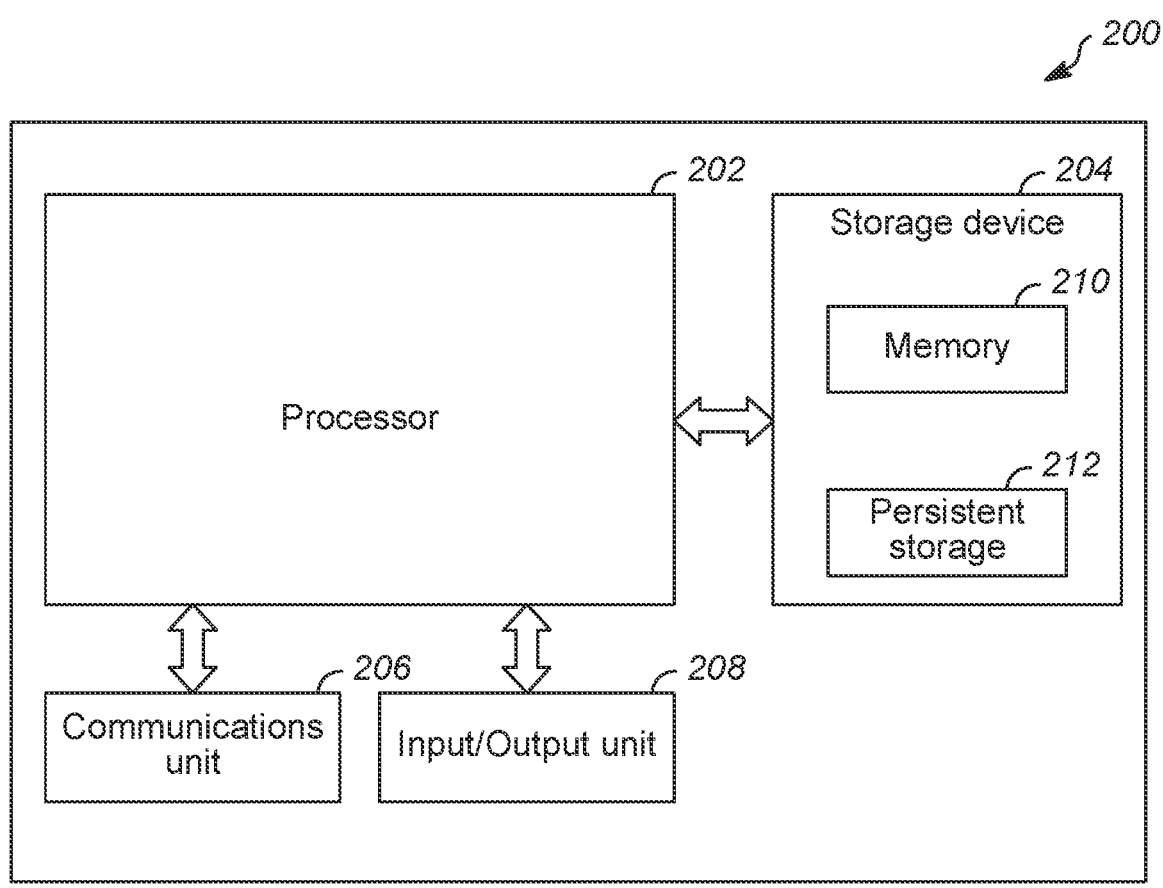

FIG. 2 illustrates an example device 200 in connection with sensor and sampling system 10 according to this disclosure. The device 200 could, for example, denote any of the controllers, operator stations, or other devices in or used in conjunction with the system 10 in FIG. 1. The device 200 could also represent the computing device that implements part or all of the control approach 200 in FIG. 2. However, the device 200 could be used in any other suitable system.

As shown in FIG. 2, the device 200 includes at least one processor 202, at least one storage device 204, at least one communications unit 206, and at least one input/output (I/O) unit 208. Each processor 202 can execute instructions, such as those that may be loaded into a memory 210. The instructions could implement the functionality described herein. Each processor 202 denotes any suitable processing device, such as one or more microprocessors, microcontrollers, digital signal processors, application specific integrated circuits (ASICs), field programmable gate arrays (FPGAs), or discrete circuitry.

The memory 202 and a persistent storage 212 are examples of storage devices 204, which represent any structure(s) capable of storing and facilitating retrieval of information (such as data, program code, and/or other suitable information on a temporary or permanent basis). The memory 210 may represent a random-access memory or any other suitable volatile or non-volatile storage device(s). The persistent storage 212 may contain one or more components or devices supporting longer-term storage of data, such as a read only memory, hard drive, Flash memory, or optical disc. The data includes both process information such as pressure and temperature as well as compositional information.

The communications unit 206 supports communications with other systems or device. For example, the communications unit 206 could include a network interface card or a wireless transceiver facilitating communications over a wired or wireless network. The communications unit 206 may support communications through any suitable physical or wireless communication link(s).

The I/O unit 208 allows for input and output of data. For example, the I/O unit 208 may provide a connection for user input through a keyboard, mouse, keypad, touchscreen, or other suitable input device. The unit 208 may also send output to a display, printer, or other suitable output device.

Although FIG. 2 illustrates one example of a device 200 various changes may be made to FIG. 2. For example, components could be added, omitted, combined, further subdivided, or placed in any other suitable configuration according to particular needs. Also, computing devices can come in a wide variety of configurations, and FIG. 2 does not limit this disclosure to any particular configuration of computing device.

Understanding the nature of the process as having a slow dynamic for the critical variables measured, this invention does not intend to rapidly change samples and make continuous changes to the operation of the unit. Instead the samples are analyzed to deliver updates to the cloud based process model for process operational instructions to be updated one or two times per day. This reduces the cost of the on-line analyzer solution while meeting the process benefit requirements for this application.

Specific Embodiments

While the following is described in conjunction with specific embodiments, it will be understood that this description is intended to illustrate and not limit the scope of the preceding description and the appended claims.

A first embodiment of the invention is a method of monitoring and controlling a dehydrogenation reactor system wherein the dehydrogenation reactor system comprises a plurality of reactors and heaters with the heaters positioned upstream from each reactor and a hydrocarbon feed stream being heated by each of the heaters and undergoing reactions in the reactors, the method comprising comparing compositions of a sample to a predetermined composition range; taking at least one action to modify operation of the dehydrogenation reactor system when the composition of a sample varies more than a predetermined amount from the predetermined composition range. An embodiment of the invention is one, any or all of prior embodiments in this paragraph up through the first embodiment in this paragraph further comprising sampling a process fluid for analysis. An embodiment of the invention is one, any or all of prior embodiments in this paragraph up through the first embodiment in this paragraph wherein the process fluid is analyzed using a gas chromatograph. An embodiment of the invention is one, any or all of prior embodiments in this paragraph up through the first embodiment in this paragraph wherein multiple samples are sent to a single chromatograph for analysis automatically under computer-controlled sequencing. An embodiment of the invention is one, any or all of prior embodiments in this paragraph up through the first embodiment in this paragraph further comprising monitoring plant process data selected from at least one of temperature, pressure and flow rate at each of the sampling locations. An embodiment of the invention is one, any or all of prior embodiments in this paragraph up through the first embodiment in this paragraph wherein the actions to modify the operation occur between once per hour and once per week. An embodiment of the invention is one, any or all of prior embodiments in this paragraph up through the first embodiment in this paragraph wherein the actions to modify the operation occur between once per hour and once per day. An embodiment of the invention is one, any or all of prior embodiments in this paragraph up through the first embodiment in this paragraph wherein the actions to modify the operation occur between at most twice per day. An embodiment of the invention is one, any or all of prior embodiments in this paragraph up through the first embodiment in this paragraph wherein the variation in composition of the sample measures increases in hydrogen and C1-C2 compounds. An embodiment of the invention is one, any or all of prior embodiments in this paragraph up through the first embodiment in this paragraph wherein the dehydrogenation reactor system comprises at least two reactors and two heaters. An embodiment of the invention is one, any or all of prior embodiments in this paragraph up through the first embodiment in this paragraph wherein at least a portion of the samples is returned to the dehydrogenation reactor system. An embodiment of the invention is one, any or all of prior embodiments in this paragraph up through the first embodiment in this paragraph wherein the at least one action comprises adjusting operation of at least one heater to modify the temperature at a sampling location at a reactor inlet. An embodiment of the invention is one, any or all of prior embodiments in this paragraph up through the first embodiment in this paragraph wherein the at least one action comprises determining a type of action to repair, or maintenance to take, to return operation of the heater to produce a composition within the predetermined composition range. An embodiment of the invention is one, any or all of prior embodiments in this paragraph up through the first embodiment in this paragraph wherein the action is selected from replacement of catalyst, adjusting heater operating burners performance or adjusting reactor inlet temperature. An embodiment of the invention is one, any or all of prior embodiments in this paragraph up through the first embodiment in this paragraph wherein the sampling device is first flushed with a quantity of the sample before a set of composition measurements is taken. An embodiment of the invention is one, any or all of prior embodiments in this paragraph up through the first embodiment in this paragraph wherein the composition of the sample is analyzed to determine a proportion of the sample that is a cracked product of C3 hydrocarbons selected from hydrogen, C1 and C2 hydrocarbons. An embodiment of the invention is one, any or all of prior embodiments in this paragraph up through the first embodiment in this paragraph wherein the sample temperature is reduced from reaction conditions to above ambient conditions, to a temperature above condensing conditions, to a temperature below further cracking reaction and preferably about 185° C. prior to analysis by a gas chromatograph. An embodiment of the invention is one, any or all of prior embodiments in this paragraph up through the first embodiment in this paragraph wherein the sample temperature is reduced from reaction conditions to a temperature above condensing conditions prior to analysis by a gas chromatograph. An embodiment of the invention is one, any or all of prior embodiments in this paragraph up through the first embodiment in this paragraph wherein the sample temperature is reduced from reaction conditions to a temperature below further cracking reactions prior to analysis by a gas chromatograph. An embodiment of the invention is one, any or all of prior embodiments in this paragraph up through the first embodiment in this paragraph wherein the sample temperature is reduced from reaction conditions to about 180 to 260° C. prior to analysis by a gas chromatograph. An embodiment of the invention is one, any or all of prior embodiments in this paragraph up through the first embodiment in this paragraph wherein the predetermined composition range is based upon a model of expected cracking of C3 during operation of the reactors. An embodiment of the invention is one, any or all of prior embodiments in this paragraph up through the first embodiment in this paragraph further comprising displaying the composition data on a display visible to an operator of the dehydrogenation reactor system. An embodiment of the invention is one, any or all of prior embodiments in this paragraph up through the first embodiment in this paragraph wherein the composition data measured by the sampling device is compared to the predetermined composition range.

A second embodiment of the invention is a system for monitoring performance of an endothermic reactor system comprising a series of heaters with each of the heaters connected to a reactor inlet of each of a series of reactors wherein each of the heaters have a heater inlet and a heater outlet; a sampling location configured to remove a sample of a hydrocarbon composition positioned prior to an inlet and an outlet of each of the heaters and a sensor positioned at each of the sampling locations wherein each of the sensors is configured to measure at least one property selected from temperature, pressure and mass flow rate; a gas chromatograph configured to receive each of the samples in sequence and to produce a report of each of the sample's composition; a database containing data of predicted compositions of the samples and predicted property values; a computer to compare the report with the predicted compositions; and a display to show a visualization showing the comparison and suggesting corrective measures to take to return the composition in the report to the predicted composition values. An embodiment of the invention is one, any or all of prior embodiments in this paragraph up through the second embodiment in this paragraph wherein the gas chromatograph is a single gas chromatograph for all samples. An embodiment of the invention is one, any or all of prior embodiments in this paragraph up through the second embodiment in this paragraph wherein the sampling locations comprise sample take offs with automated isolation valves, moderation cooler and pre-insulated sample connection lines configured to immediately reduce cracking potential and to deliver consistent sampling conditions to the gas chromatograph. An embodiment of the invention is one, any or all of prior embodiments in this paragraph up through the second embodiment in this paragraph further comprising a common return line wherein all samples enter the common return line connected to a single point in the endothermic reactor system. An embodiment of the invention is one, any or all of prior embodiments in this paragraph up through the second embodiment in this paragraph further comprising a compressor connected to a common return line configured to compress the sample near a system pressure at a return point. An embodiment of the invention is one, any or all of prior embodiments in this paragraph up through the second embodiment in this paragraph further comprising controls to send a signal to the system to flush a previous sample. An embodiment of the invention is one, any or all of prior embodiments in this paragraph up through the second embodiment in this paragraph further comprising adjustable programming configured to take multiple samples from a same location in series during the sequence or to program an alternate sequence of samples from any of the sampling locations in an order determined by an operator.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A method of monitoring and controlling a dehydrogenation reactor system wherein said dehydrogenation reactor system comprises a plurality of reactors and heaters with said heaters positioned upstream from each reactor and a hydrocarbon feed stream being heated by each of said heaters and undergoing reactions in said reactors, said method comprising:
    a. removing a sample of the hydrocarbon feed stream prior to an inlet and an outlet of said heaters;
    b. comparing compositions of a sample to a predetermined composition range;
    c. taking at least one action to modify operation of said dehydrogenation reactor system when said composition of a sample varies more than a predetermined amount from said predetermined composition range.

2. The method of claim 1 further comprising sampling a process fluid for analysis.

3. The method of claim 2 wherein the process fluid is analyzed using a gas chromatograph.

4. The method of claim 3 wherein multiple samples are sent to a single chromatograph for analysis automatically under computer controlled sequencing.

5. The method of claim 1 further comprising monitoring plant process data selected from at least one of temperature, pressure and flow rate at each of said sampling locations.

6. The method of claim 1 wherein said actions to modify said operation occur between once per hour and once per day.

7. The method of claim 1 wherein said variation in composition of said sample measures increases in hydrogen and C1-C2 compounds.

8. The method of claim 2 wherein at least a portion of said samples is returned to said dehydrogenation reactor system.

9. The method of claim 1 wherein said at least one action comprises adjusting operation of at least one heater to modify the temperature at a sampling location at a reactor inlet, determining a type of action to repair, or maintenance to take, to return operation of the heater to produce a composition within the predetermined composition range.

10. The method of claim 2 wherein said sampling device is first flushed with a quantity of said sample before a set of composition measurements is taken.

11. The method of claim 1 wherein said composition of said sample is analyzed to determine a proportion of said sample that is a cracked product of C3 hydrocarbons selected from hydrogen, C1 and C2 hydrocarbons.

12. The method of claim 1 wherein said sample temperature is reduced from reaction conditions to a temperature above condensing conditions prior to analysis by a gas chromatograph.

13. The method of claim 1 wherein said sample temperature is reduced from reaction conditions to a temperature below further cracking reactions prior to analysis by a gas chromatograph.

14. The method of claim 1 wherein said predetermined composition range is based upon a model of expected cracking of C3 during operation of said reactors.

15. The method of claim 14 wherein said composition data measured by said sampling device is compared to said predetermined composition range.

16. A system for monitoring performance of an endothermic reactor system comprising
   a. a series of heaters with each of said heaters connected to a reactor inlet of each of a series of reactors wherein each of said heaters have a heater inlet and a heater outlet;
   b. a sampling location configured to remove a sample of a hydrocarbon composition positioned prior to an inlet and an outlet of each of said heaters and a sensor positioned at each of said sampling locations wherein each of said sensors is configured to measure at least one property selected from temperature, pressure and mass flow rate;
   c. a gas chromatograph configured to receive each of said samples in sequence and to produce a report of each of said sample's composition;
   d. a database containing data of predicted compositions of said samples and predicted property values;
   e. a computer to compare said report with said predicted compositions; and
   f. a display to show a visualization showing said comparison and suggesting corrective measures to take to return said composition in said report to said predicted composition values.

17. The system of claim 16 wherein said gas chromatograph is a single gas chromatograph for all samples.

18. The system of claim 16 wherein said sampling locations comprise sample take offs with automated isolation valves, moderation cooler and pre-insulated sample connection lines configured to immediately reduce cracking potential and to deliver consistent sampling conditions to the gas chromatograph.

19. The system of claim 16 further comprising a compressor connected to a common return line configured to compress the sample near a system pressure at a return point.

20. The system of claim 16 further comprising adjustable programming configured to take multiple samples from a same location in series during said sequence or to program an alternate sequence of samples from any of the sampling locations in an order determined by an operator.

* * * * *